(12) United States Patent
Fanelli et al.

(10) Patent No.: US 12,000,470 B2
(45) Date of Patent: Jun. 4, 2024

(54) COMPACT BELTED STRAIN WAVE GEAR APPARATUS AND A VEHICLE LIFTING SYSTEM INCLUDING THE COMPACT BELTED STRAIN WAVE GEAR APPARATUS

(71) Applicant: BeijingWest Industries Co., Ltd., Beijing (CN)

(72) Inventors: Dominique Fanelli, Bouffemont (FR); Dominique Pampirio, Argenteuil (FR); Jocelyn Marchand, Levallois Perret (FR)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 62 days.

(21) Appl. No.: 17/849,695

(22) Filed: Jun. 26, 2022

(65) Prior Publication Data
US 2022/0356937 A1    Nov. 10, 2022

Related U.S. Application Data

(63) Continuation-in-part of application No. 16/894,702, filed on Jun. 5, 2020, now Pat. No. 11,384,825.
(Continued)

(30) Foreign Application Priority Data

May 29, 2020  (CN) .......................... 202010472564.0
May 10, 2022  (CN) .......................... 202210502380.3

(51) Int. Cl.
  *F16H 49/00*       (2006.01)
(52) U.S. Cl.
  CPC ..... *F16H 49/001* (2013.01); *F16H 2049/003* (2013.01)

(58) Field of Classification Search
  CPC .................................................... F16H 49/001
(Continued)

(56) References Cited

U.S. PATENT DOCUMENTS 3,160,032 A    12/1964  Black
3,187,605 A     6/1965  Ericson
(Continued)

FOREIGN PATENT DOCUMENTS

CN    103727209 A    4/2014
CN    106062413 A   10/2016
(Continued)

OTHER PUBLICATIONS

Extended European Search Report dated Nov. 30, 2022, for counterpart European patent application No. 22186939.9.
(Continued)

*Primary Examiner* — Ha Dinh Ho
(74) *Attorney, Agent, or Firm* — William H. Honaker; Dickinson Wright PLLC

(57) ABSTRACT

A wave gear apparatus comprises a spline having top, bottom, exterior, and interior surfaces. A plurality of spline teeth extend from the interior surface toward a center axis. A wave generator is rotatably disposed in the spline. A belt assembly extends about the wave generator and includes a plurality of belt teeth extending radially outwardly, whereby a total number of the belt teeth is less than a total number of the spline teeth. An output member defines a recess receiving the wave generator and the belt whereby, in response to a rotational movement from the wave generator, the output member rotates in a direction same or opposite of the wave generator. A bearing assembly is disposed between the wave generator and the belt assembly and includes a plurality of
(Continued)

needles each extending parallel to the center axis. A vehicle lifting system including the wave gear apparatus is also disclosed herein.

20 Claims, 14 Drawing Sheets

Related U.S. Application Data

(60) Provisional application No. 63/228,971, filed on Aug. 3, 2021, provisional application No. 62/858,776, filed on Jun. 7, 2019.

(58) Field of Classification Search
USPC .......................................................... 74/640
See application file for complete search history.

(56) References Cited

U.S. PATENT DOCUMENTS

| | | | |
|---|---|---|---|
| 3,906,527 | A | 9/1975 | Erlichman |
| 3,986,412 | A | 10/1976 | Farley |
| 4,237,751 | A | 12/1980 | Davis |
| 8,020,470 | B2 | 9/2011 | Saito |
| 8,195,361 | B2 | 6/2012 | Kajino et al. |
| 9,136,745 | B2 | 9/2015 | Nagahama |
| 9,266,604 | B2 | 2/2016 | Salamat et al. |
| 9,360,098 | B2 * | 6/2016 | Roopnarine ........ F16H 55/0833 |
| 9,415,655 | B2 | 8/2016 | Willems |
| 10,584,782 | B2 | 3/2020 | Balsiger et al. |
| 2014/0256495 | A1 | 9/2014 | Waide |
| 2015/0075310 | A1 * | 3/2015 | Lunin ................... F16H 49/001 74/412 R |
| 2016/0010738 | A1 * | 1/2016 | Balsiger ................. H02K 7/116 29/893.1 |
| 2019/0153909 | A1 | 5/2019 | Hain et al. |

FOREIGN PATENT DOCUMENTS

| | | |
|---|---|---|
| CN | 206522422 U | 9/2017 |
| CN | 107387725 A | 11/2017 |
| CN | 110242710 A | 9/2019 |
| DE | 12013002132 T5 | 2/2015 |
| DE | 102016219076 A1 | 8/2017 |
| DE | 102017202541 A1 | 8/2018 |
| EP | 2574745 A1 | 4/2013 |
| EP | 3271614 B1 | 4/2019 |
| EP | 3748201 A2 | 12/2020 |
| JP | 62209247 A | 9/1987 |
| JP | 2007205397 A | 8/2007 |
| JP | 2009299780 A | 12/2009 |
| JP | 2013119919 A | 6/2013 |
| JP | 5855274 B2 | 2/2017 |
| JP | 2020200946 A | 12/2020 |
| SU | 1321963 A1 | 12/1985 |
| SU | 1416299 A1 | 8/1988 |
| WO | 2018149560 A1 | 8/2018 |
| WO | 2009157607 A1 | 12/2019 |

OTHER PUBLICATIONS

First Office Action issued for corresponding Japanese Patent Application 2022-121892 dated Sep. 26, 2023.

Decision of Dismissal of Amendment by the Japan Patent Office issued for corresponding Japanese Patent Application No. 2022-121892 mailed on Mar. 19, 2024 with an English translation.

* cited by examiner

COMPACT BELTED STRAIN WAVE GEAR APPARATUS AND A VEHICLE LIFTING SYSTEM INCLUDING THE COMPACT BELTED STRAIN WAVE GEAR APPARATUS

CROSS-REFERENCE TO RELATED APPLICATIONS

This application is a Continuation-In-Part of U.S. Non-Provisional patent application Ser. No. 16/894,702, filed Jun. 5, 2020 and claims the benefit of U.S. Provisional Patent Application Ser. No. 62/858,776, filed on Jun. 7, 2019, Chinese Patent Application No. 202010472564.0, filed on May 29, 2020, U.S. Provisional Patent Application Ser. No. 63/228,971, filed on Aug. 3, 2021, and Chinese Patent Application No. CN202210502380.3, filed on May 10, 2022, the entire disclosure of which are hereby incorporated herein by reference.

BACKGROUND OF THE INVENTION

1. Field of the Invention

The present invention generally relates to a strain wave gear apparatus and, in particular, a strain wave gear apparatus for use with a vehicle lifting system.

2. Description of the Prior Art

Harmonic drives are well known in the art. Typically, the harmonic drives are a single-stage gear transmission having three main components. These components are known as the circular spline, the flexspline, and the wave generator. The circular spline is a circular, rigid sun gear with teeth on its inner surface. The flexspline is a thin-walled cup with teeth on its outer surface, which are designed to mesh with the teeth of the circular spline. The flexspline is radially flexible and torsionally rigid, and has fewer teeth and a smaller radius than the circular spline. The wave generator is a non-circular cam, which fits inside the flexspline and deforms it to cause some of its teeth to mesh with the teeth of the circular spline and others to completely unmesh. Each full rotation of the wave generator causes the flexspline to walk around the circular spline at a rate equal to the difference in the number of teeth of the flexspline to the number of teeth of the circular spline. For example, if the circular spline has 100 teeth and the flexspline has 98 teeth, each revolution of the wave generator will walk the flexspline around the circular spline a distance equal to two teeth. For example, if the circular spline has 100 teeth and the flexspline has 98 teeth and the output member has 98 teeth, each revolution of the wave generator will walk the flexspline around the circular spline a distance equal to two teeth. In this case, the output member rotates in the opposite direction of the wave generator. In another case, if the circular spline has 98 teeth and the flexspline has 98 teeth, and the output member has 100 teeth, each revolution of the wave generator will again walk the flexspline around the circular spline a distance equal to two teeth. In this case, the output member rotates in the same direction of the wave generator.

Industries benefiting from harmonic drive gearing include semiconductor, machine tool, factory automation, robotics, medical equipment and aerospace. Medical applications benefiting from harmonic drive gearing include patient beds, rehabilitations equipment, and MRI/CAT scan gantries. Other uses for harmonic drives include radiation therapy equipment, imaging camera positioning and surgical robots. Robots used in semiconductor component manufacturing use harmonic drives to accurately position wafers for processing, loading, unloading, inspection and test. Military and aerospace applications of harmonic drive gearing include communication, military surveillance, and weather satellites, several deep space probes, telescopes including the Hubble Space Telescope, and the International Space Station. Harmonic Drives are used to accurately control antennas and compass gimbals, to align scientific instruments, adjust apertures and solar panels and open and close hatches and doorways.

These applications require high positional accuracy, repeatability, and low vibration. Harmonic drive gear sets are ideal for precision applications that require a compact design and high torque to weight ratio. They are capable of less than one arc minute positional accuracy and repeatability of +/−5 arc seconds without the benefit of feedback at the output stage The traditional design for harmonic drive gearing involves a flexspline with two fewer teeth than the circular spline and an elliptical wave generator designed such that it causes the teeth of the flexspline to mesh with the teeth of the circular spline in two zones, diametrically opposed to each other and corresponding to the major axis of the ellipse. The minor axis of the wave generator is short enough that it allows the teeth of the flexspline to completely unmesh in the zones along the minor axis and allows a one-tooth difference in length between the circular spline and the flexspline in the areas of no contact. The torque capacity of the gearing system is equal to the shear force necessary to cause the teeth in contact to fail. This so allows the existence of a "ratcheting torque," under which the flexspline may slip by a distance of one tooth relative to the circular spline. This increases the number of teeth in contact and therefore the torque capacity and the torsional rigidity. However, this condition greatly increases the forces on the flexspline, greatly reducing its fatigue life. Furthermore, it throws the system out of balance, greatly increasing noise and vibration and reducing positional accuracy.

One such a harmonic drive gearing is disclosed in U.S. Pat. No. 3,906,527. The harmonic drive gearing includes a spline having a top surface, a bottom surface, an exterior surface, and an interior surface. The top surface and the bottom surface are axially spaced from one another. The exterior surface and the interior surface extend annularly about a center axis and connect the top surface with the bottom surface. A plurality of spline teeth extend from the interior surface toward the center axis. A wave generator is rotatably disposed in the spline.

Accordingly, there exist a need to provide a harmonic drive that minimizes the motor size, is adaptable to different vehicle architectures, light weight, and low noise, vibration, and harshness (NVH).

SUMMARY OF THE INVENTION

The present invention provides a wave gear apparatus that is light weight and compact. The present invention also provides wave gear apparatus that is easy to assemble. The present invention further provides a wave gear apparatus that has a minimum noise, vibration, and harshness (NVH).

It is one aspect of the present invention to provide a wave gear apparatus. The wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core; and a belt assembly extending about the wave generator. The belt assembly includes a ring-shaped substrate defining a plurality of belt teeth extending radially outwardly and configured to engage the spline teeth, whereby a total number of the belt teeth is less than a total number of the spline teeth. The wave gear apparatus also comprises a bearing assembly disposed between the wave generator and the belt assembly and including a plurality of needles each extending parallel to the center axis; and an output member engaging the belt assembly and defining a recess receiving the wave generator and the belt assembly.

It is another aspect of the present invention to provide a wave gear apparatus. The wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core; and a belt assembly extending about the wave generator, the belt assembly including a backing sleeve and a ring-shaped substrate defining a plurality of belt teeth extending radially outwardly for engaging the spline teeth, whereby a total number of the belt teeth is less than a total number of the spline teeth. The wave gear apparatus also comprises a bearing assembly disposed between the wave generator and the belt assembly; and an output member engaging the belt assembly and defining a recess receiving the wave generator and the belt assembly.

It is another aspect of the present invention to provide a wave gear apparatus. The wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core, the eccentric core defining an indentation; and a belt assembly extending about the wave generator, the belt assembly including a ring-shaped substrate defining a plurality of belt teeth extending radially outwardly for engaging the spline teeth, whereby a total number of the belt teeth is less than a total number of the spline teeth. The wave gear apparatus also comprises a cladding sleeve surrounding the eccentric core of the wave generator, the cladding sleeve including a protrusion configured to engage the indentation in the eccentric core for preventing relative rotation between the eccentric core and the cladding sleeve; a bearing assembly disposed between the cladding sleeve and the belt assembly; and an output member engaging the belt assembly and defining a recess receiving the wave generator and the belt assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
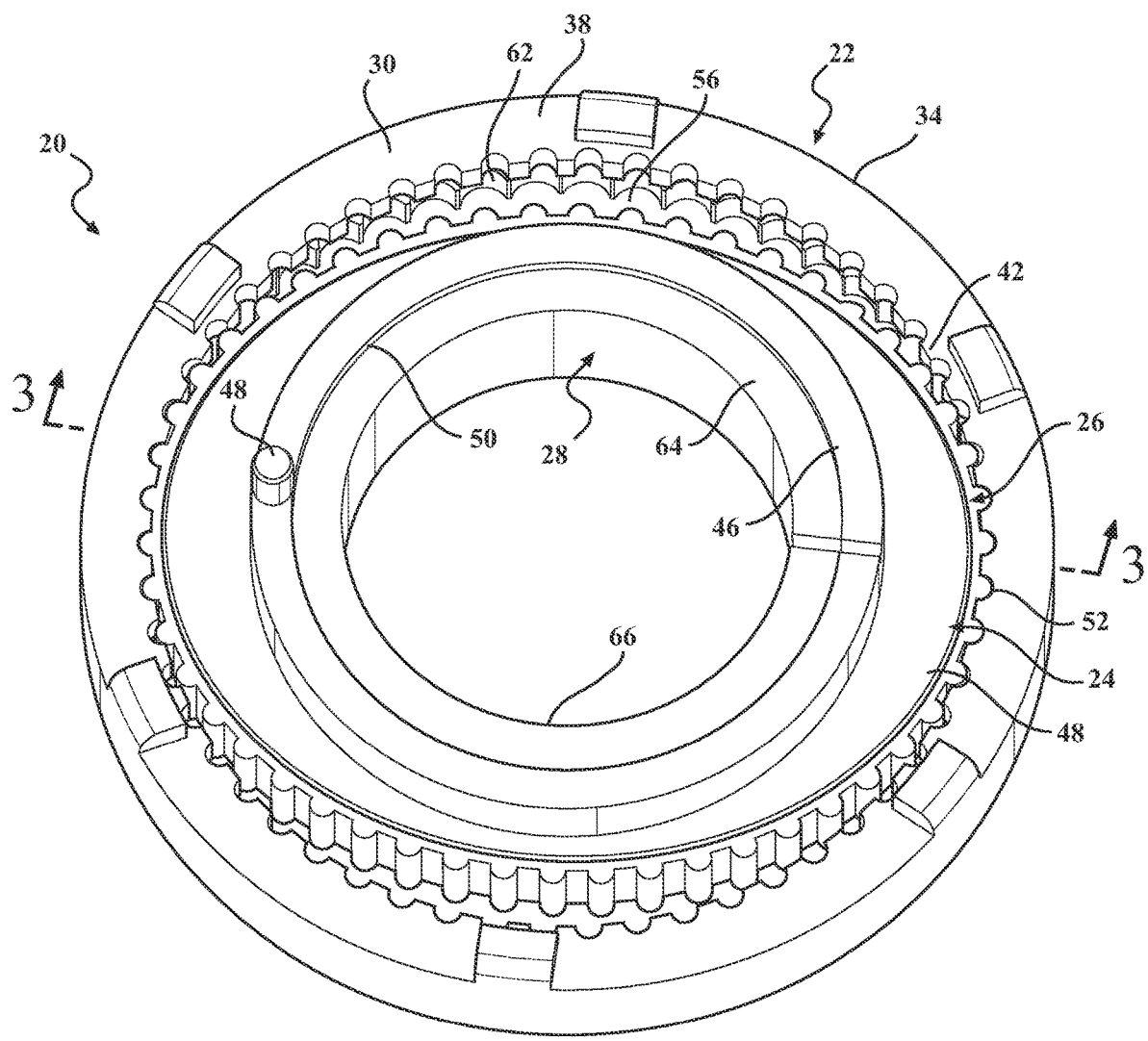
FIG. 1 is a top perspective view of a wave gear apparatus constructed in accordance with one embodiment of the present invention.

Referring to the Figures, wherein like numerals indicate corresponding parts throughout the several views, a wave gear apparatus 20 constructed in accordance with one embodiment of the present invention is generally shown in FIG. 1.

Figure 2:
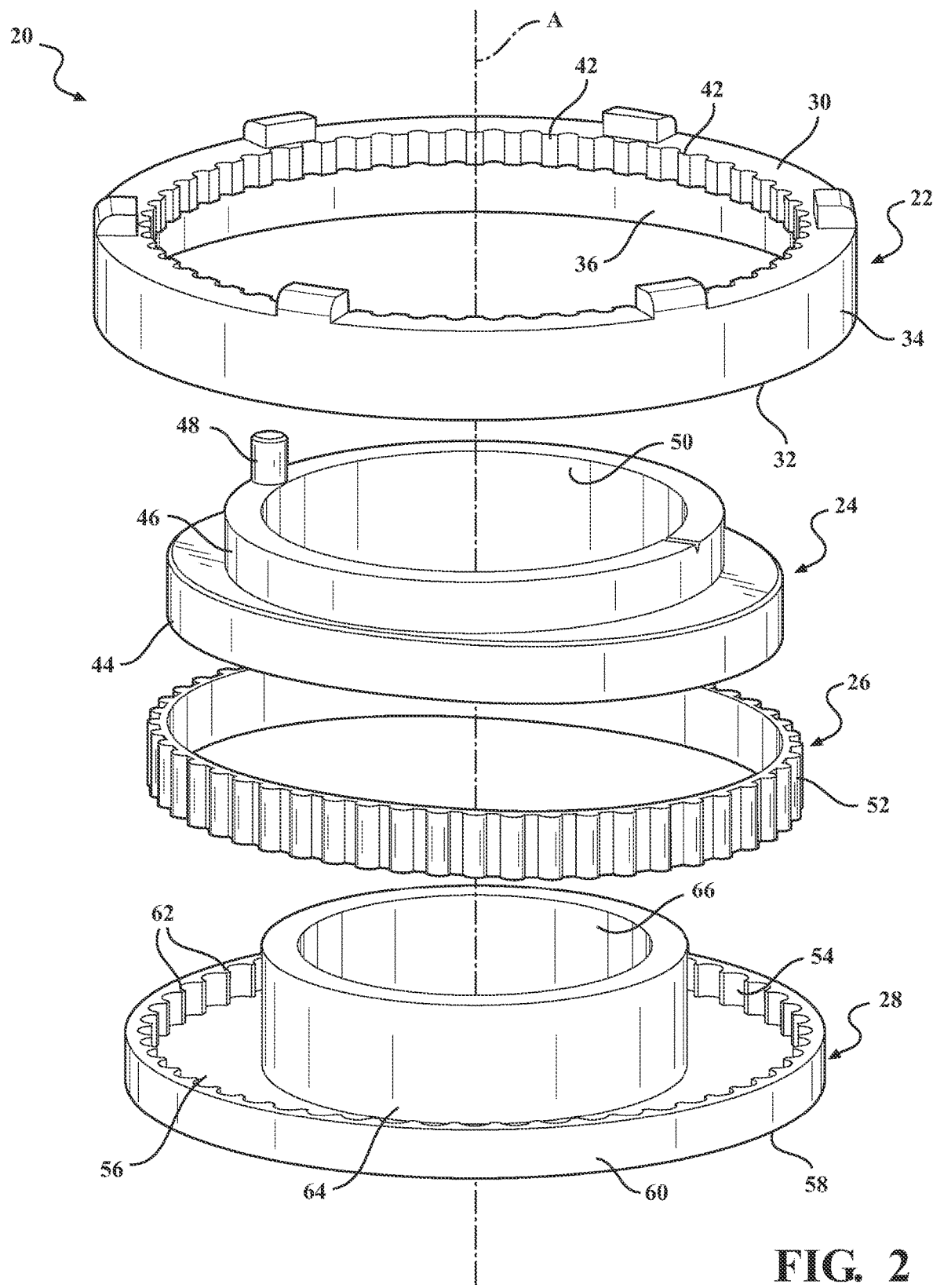
FIG. 2 is an exploded view of the wave gear apparatus.
Figure 3:
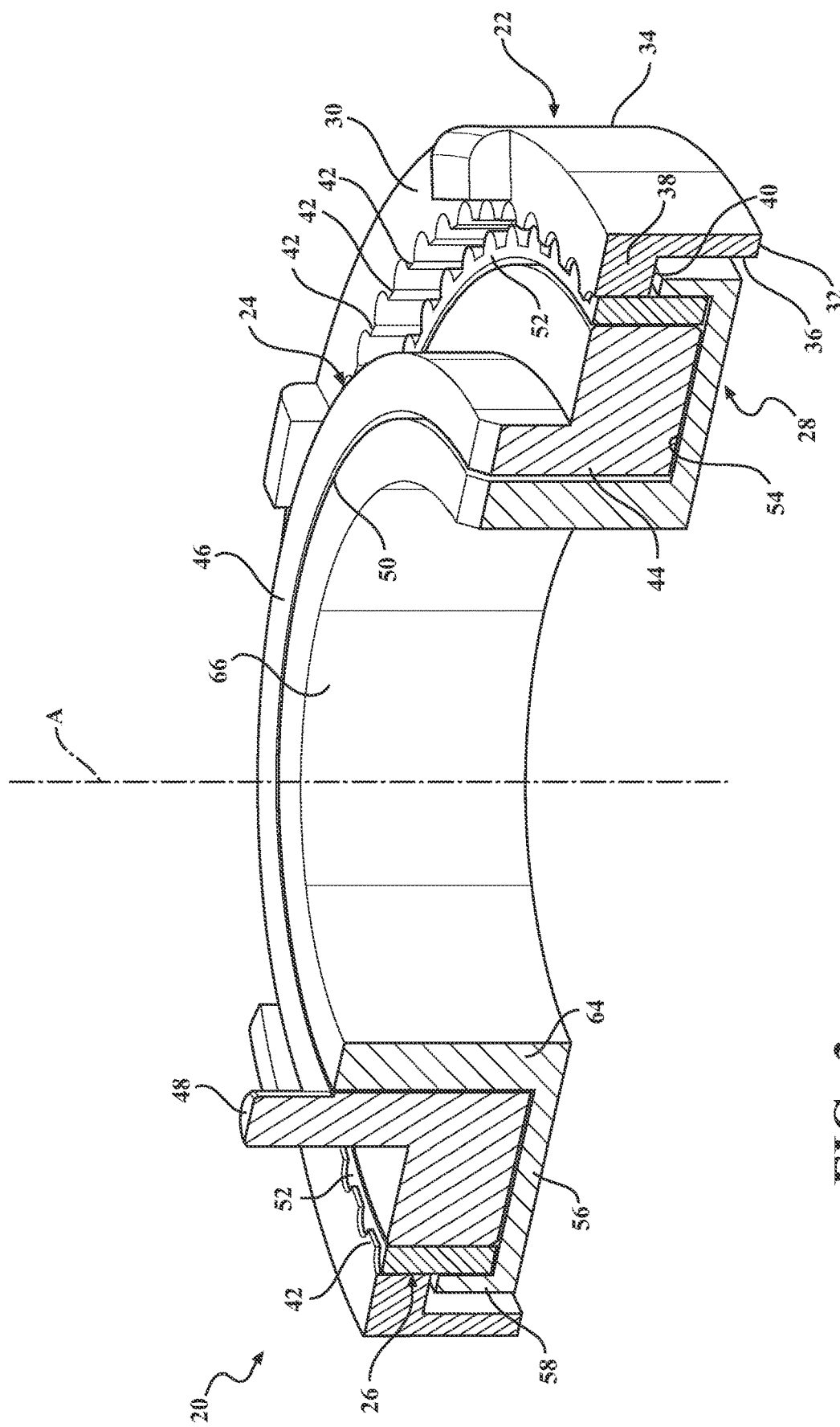
FIG. 3 is an assembled cross-sectional perspective view of the wave gear apparatus in accordance with one embodiment of the present invention along lines 3-3 of FIG. 1.

As best shown in FIGS. 1-3, the wave gear apparatus 20 comprises a spline 22, a wave generator 24, a belt assembly 26, and an output member 28. The spline 22 has a top surface 30, a bottom surface 32, an exterior surface 34, and an interior surface 36. The top surface 30 and the bottom surface 32 are mutually parallel and spaced apart from one another. The exterior surface 34 and the interior surface 36 extend annularly about a center axis A and connect the top surface 30 with the bottom surface 32. The spline 22 includes a projection 38, located on the interior surface 36 and adjacent to the top surface 30, radially inwardly toward the center axis A and annularly about the center axis A. The projection 38 also extends along the interior surface 36 from the top surface 30 toward the bottom surface 32 to a terminal end 40 spaced from the bottoms surface 32. The projection 38 includes a plurality of spline teeth 42 extending radially inwardly from the interior surface 36 and along the projection 38 and circumferentially spaced from one another. Accordingly to one embodiment of the present invention, each spline tooth of the plurality of spline teeth 42 has a generally trapezoidal shape to present a first teeth profile.

A wave generator 24 rotatably disposed in the spline 22 for engagement with the spline 22. The wave generator 24 has a bottom portion 44 and a top portion 46. The bottom portion 44, having a generally elliptical shape, extending about the center axis A. The top portion 46, having a generally circular shape, extends outwardly from the bottom portion 44. A protrusion 48 extends outwardly from the top portion 46, parallel to the center axis A. The wave generator 24 defines a bore 50 extending along the center axis A through the top portion 46 and the bottom portion 44. A belt assembly 26 extends about the bottom portion 44. The belt assembly 26 includes a ring-shaped substrate defining a plurality of belt teeth 52 extending radially outwardly and configured to engage the spline teeth 42, i.e. the belt teeth 52 diametrically meshes with the spline teeth 42, whereby a total number of the belt teeth 52 is less than a total number of the spline teeth 42. According an embodiment of the present invention, a difference between the total number of the spline teeth 42 and the total number of the belt teeth 52 is equal to 2 or 4. Because the total number of the belt teeth 52 is less than the total number of spline teeth 42, this create a reduction ratio between the rotational speed of the rotor and the rotational speed of the wave generator 24. In some embodiments, the ring-shaped substrate includes a belt of resilient material, such as an elastomeric material, which may be formed as a single-piece continuous loop. Alternatively or additionally, the ring-shaped substrate may include a chain having a plurality of links, each link defining one of said belt teeth.

The output member 28 defines a recess 54 for receiving the wave generator 24 and the belt assembly 26. The output member 28 engages the belt assembly 26. Thus, in response to a rotational movement from the wave generator 24, the output member 28 rotates in a direction same or opposite of the wave generator 24. With the wave generator 24 being received in the recess 54 of the output member 28, this makes the wave gear apparatus 20 more compact and allows for an easy assembly of the wave gear apparatus 20. The output member 28 includes a base plate 56, having a generally circular shape, is disposed on the center axis A and in abutment relationship with the belt assembly 26 and the wave generator 24. The base plate 56 has a periphery 58 extending annularly about the center axis A. A wall 60 extends axially from the base plate 56, along the periphery 58 and configured to engage the spline 22. The wall 60 includes a plurality of wall teeth 62, spaced from one another, extending radially toward the center axis A for engaging the belt assembly 26 to allow the output member 28 to rotate in a same speed as the belt assembly 26 and the wave generator 24. The wall teeth 62 present a second teeth profile that is different from the first teeth profile of the spline teeth 42 to allow the output member 28 to rotate in the same speed as the belt and the wave generator 24. According to one embodiment of the present invention, each of the wall teeth 62 has a generally triangular shape to present the second teeth profile. The output member 28 includes a collar 64 extending outwardly from the base plate 56 and annularly about the center axis A to define the recess 54 extending about the center axis A and between the collar 64, the base plate 56, and the wall 60. The collar 64 extends through the bore 50 and defines a hole 66 extending along the center axis A.

Figure 4:
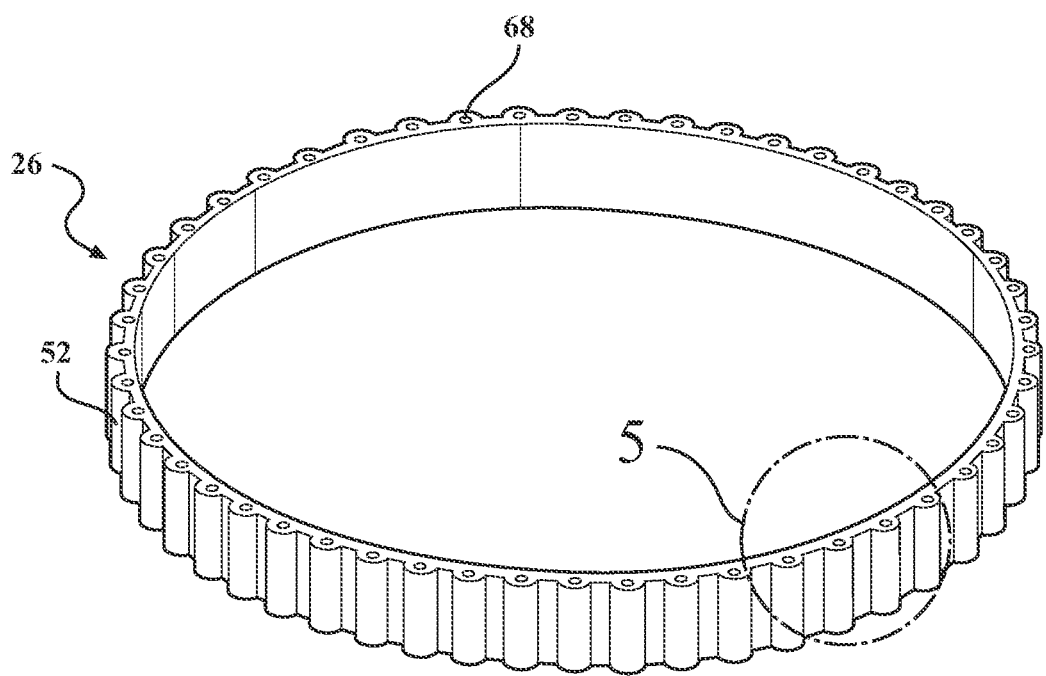
FIG. 4 is perspective view of a belt used in the wave gear apparatus in accordance with one embodiment of the present invention.
Figure 5:
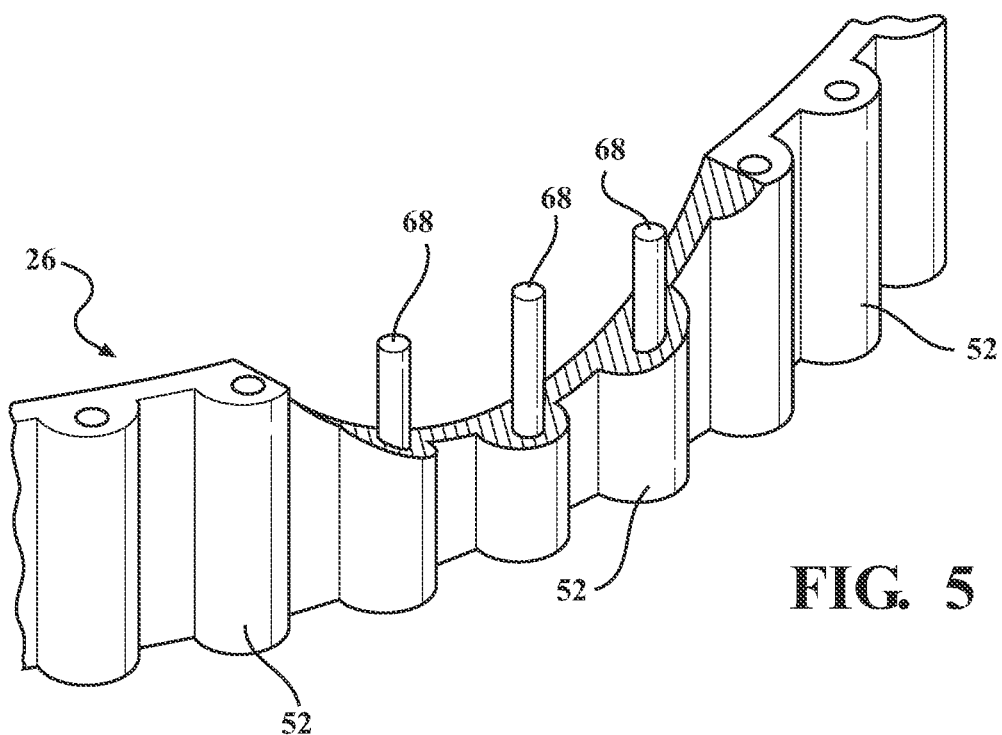
FIG. 5 is an enlarged fragmentary view of the belt in FIG. 4.
Figure 6:
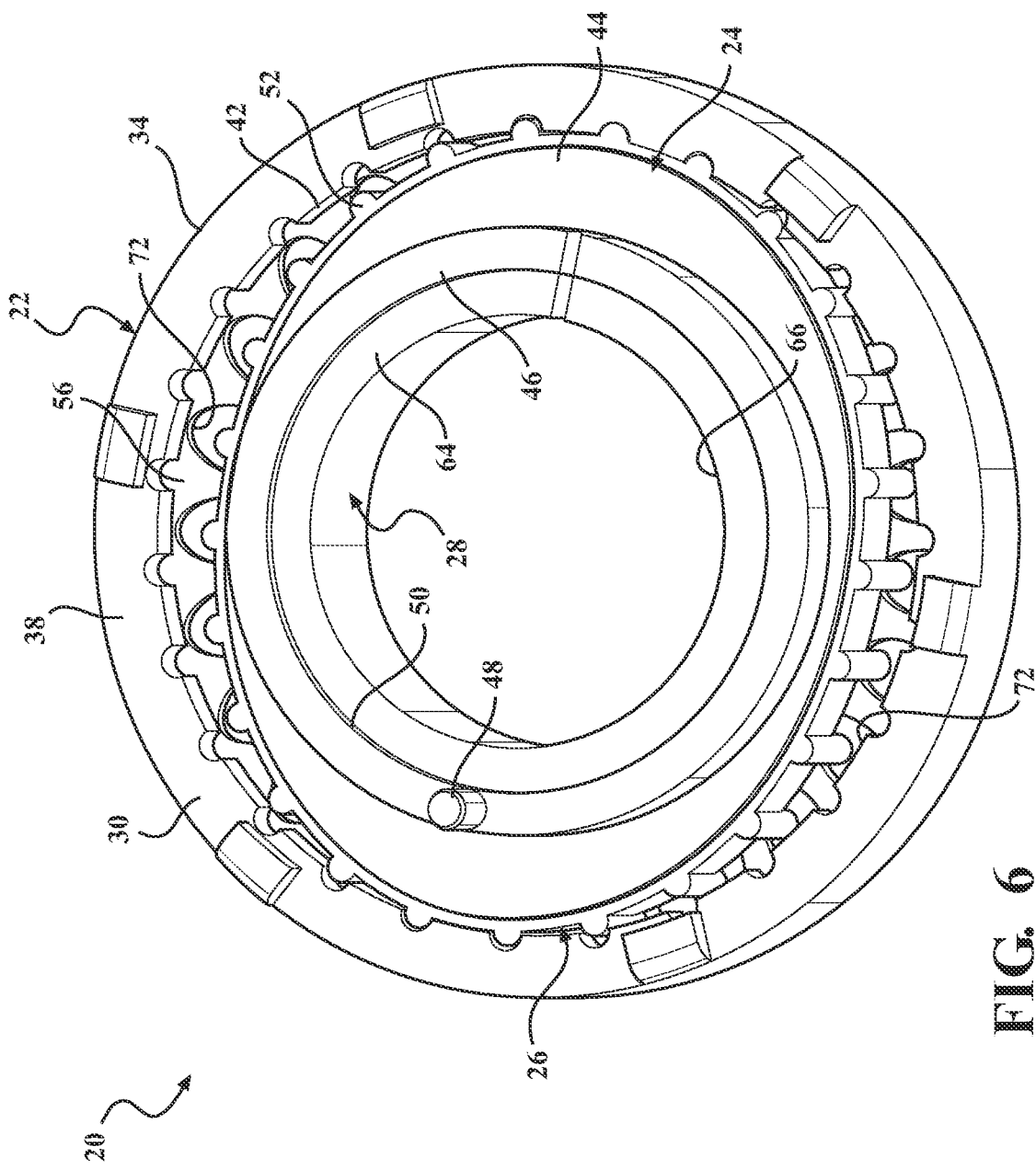
FIG. 6 is a top perspective view of a wave gear apparatus constructed in accordance with an alternative embodiment of the present invention.
Figure 7:
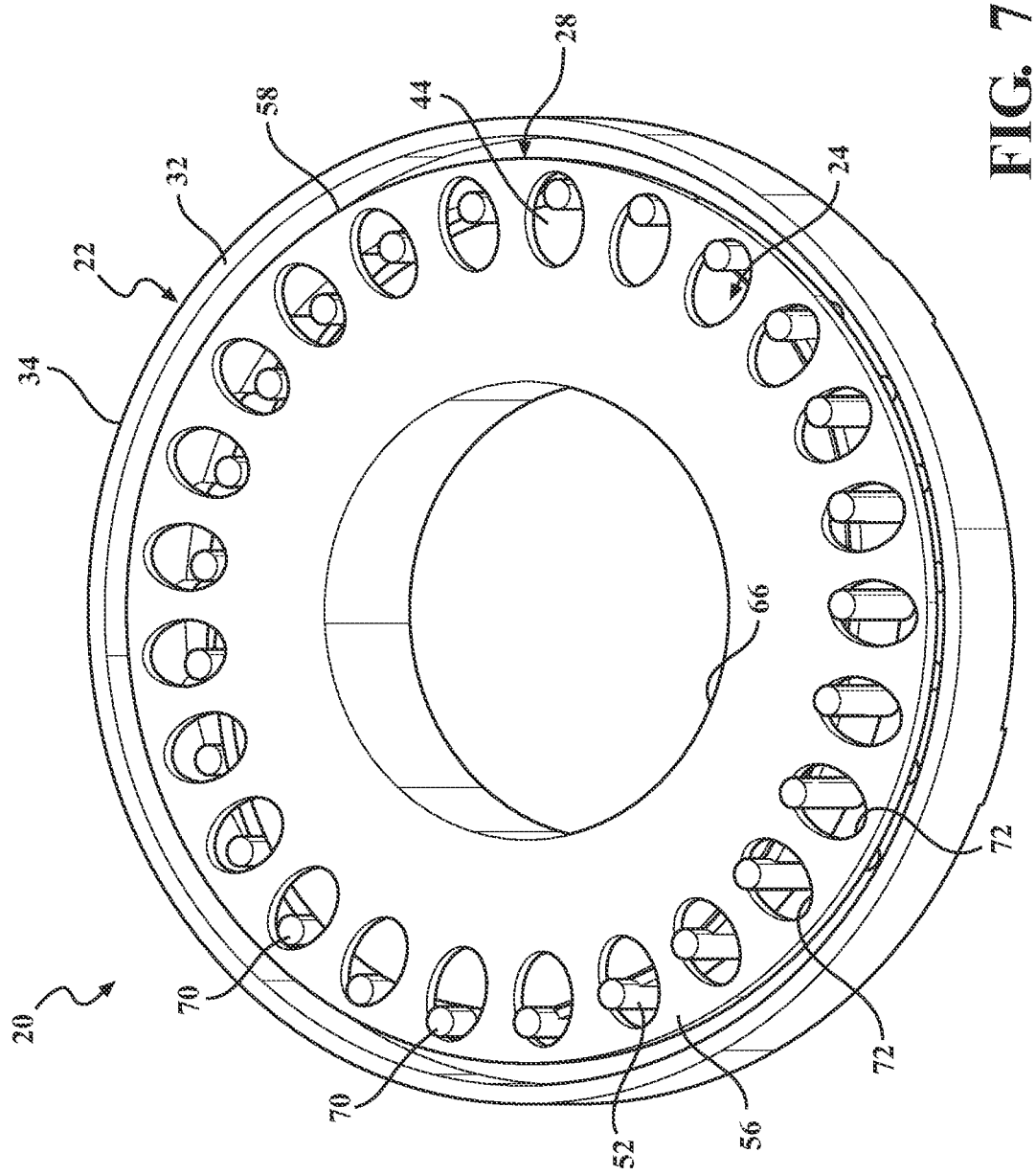
FIG. 7 is a bottom perspective view of the wave gear apparatus of FIG. 7.

FIGS. 4-7 illustrate an alternative embodiment of the present invention. As best illustrated in FIGS. 4-5, each belt tooth of the plurality of belt teeth 52 includes a metal insert 68 disposed therein to provide reinforcement and rigidity to the belt teeth 52. The metal insert 68 extends along the center axis A through the belt assembly 26 to an insert end 70 spaced apart from the belt assembly 26. As best shown in FIGS. 6-7, the base plate 56 defines a plurality of apertures 72 disposed about the center axis A to receive the insert end 70 thereby coupling the output member 28 to the wave generator 24 and the belt assembly 26 for rotation with the wave generator 24 and the belt assembly 26.

In operation, an input of a rotational movement or a torque load is first introduced to the wave gear apparatus 20 via the wave generator 24. It should be appreciated that the input can be applied via an electric motor or any other rotational movement generating source. According to one embodiment of the present invention, the protrusion 48 of the wave generator 24 can be coupled to the electric motor or the rotational movement generating source allowing the wave generator 24 to introduce the rotational movement to the wave gear apparatus 20. As the wave generator 24 rotates in the spline 22, the belt assembly 26 deforms in response to the movement of the wave generator 24 and slides around the wave generator 24. As the belt assembly 26 slides around the wave generator 24, the top half of the belt teeth 52 is in mesh engagement with the spline teeth 42. Because the total number of the belt teeth 52 is less than the total number of spline teeth 42, as the wave generator 24 rotates in the spline 22, the rotational speed of the wave generator 24 is reduced. In addition, as the belt assembly 26 slides around the wave generator 24, the bottom half of the belt teeth 52 are in mesh engagement with the wall teeth 62. Because the total number of the wall teeth 62 is equal to the total number of the belt teeth 52, the output member 28 rotates in a direction that is the same or opposite of the rotational direction of the wave generator 24. Accordingly, because the belt teeth 52 engage both the spline teeth 42 and the wall teeth 62, a shear force is generated due to the introduction of the torque load. According to one embodiment of the present invention, the belt assembly 26 can be made from an elastomeric material, e.g. rubber. With the belt assembly 26 being made from the elastomeric material, it can withstand the shear force generated due to the introduction of the rotational movement or torque load thereby reducing the noise, vibration, and harshness levels (NVH) of the wave gear apparatus.

Figure 8:
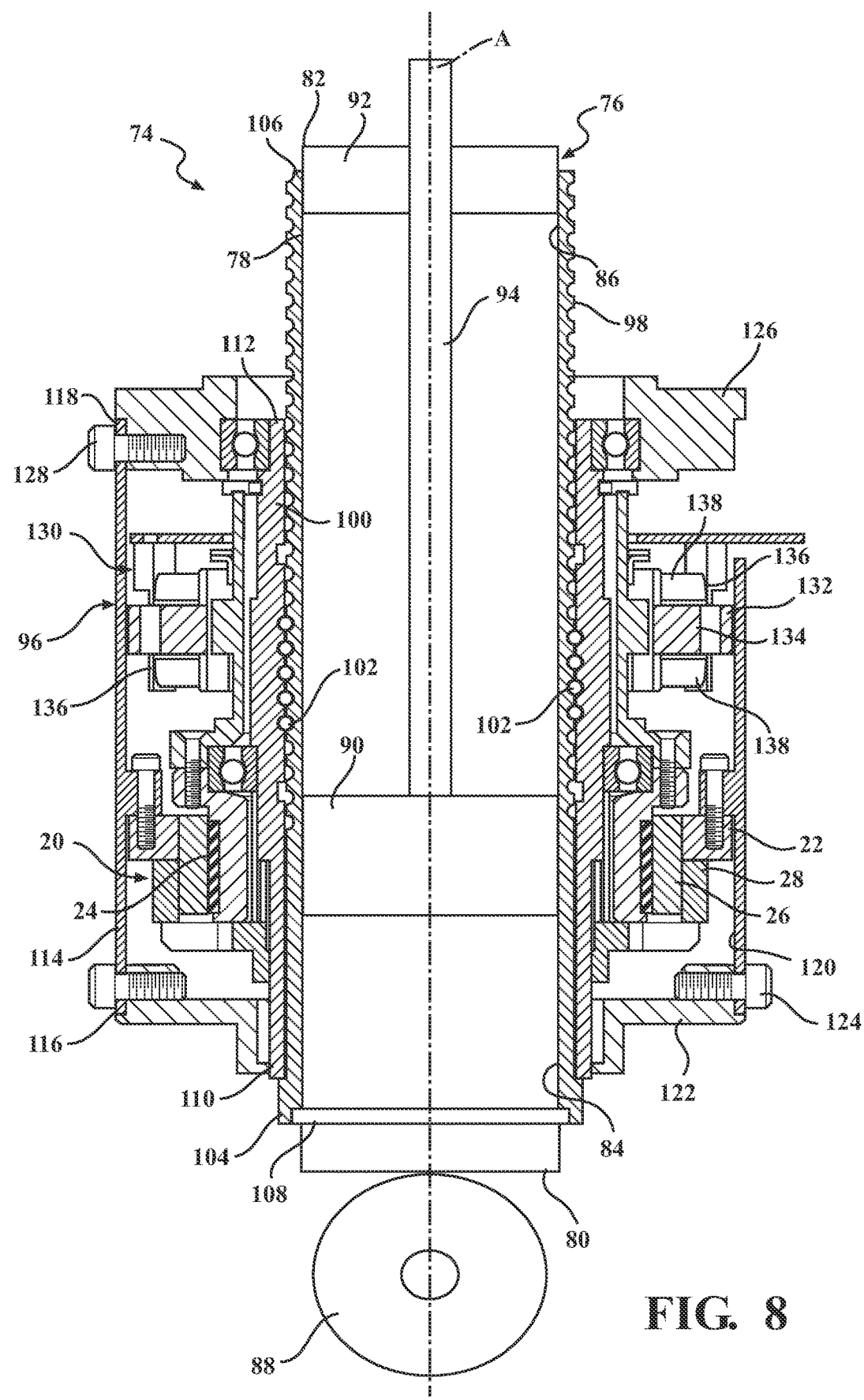
FIG. 8 is a cross-sectional perspective view of a damper including a vehicle lift system including the wave gear apparatus.

It is another aspect of the present invention to provide a vehicle lift system 74. The vehicle lift system 74 constructed in accordance with one embodiment of the present invention is generally shown in FIG. 8.

The vehicle lift system 74 can used in connection with a damper 76 of a vehicle. It should be appreciated that the damper 76 can be a hydraulic damper or a magnetorheological (MR) damper. As best illustrated in FIG. 8, the damper 76 includes a housing 78, having a generally cylindrical shape, disposed on a center axis A. The housing 78 extends between a first end 80 and a second end 82 and defines a fluid chamber 84, 86 extending between the first end 80 and the second end 82 for containing a working fluid. It should be appreciated that the working fluid can be a hydraulic fluid or an MR fluid. A mounting ring 88, having a generally circular shape, attaches to the first end 80 of the housing 78 for attachment with the vehicle.

A piston 90, slidably disposed in the fluid chamber 84, 86, divides the fluid chamber 84, 86 into a compression chamber 84 and a rebound chamber 86. The compression chamber 84 extends between the first end 80 of the housing 78 and the piston 90. The rebound chamber 86 extends between the second end 82 of the housing 78 and the piston 90. A rod guide 92, disposed in the rebound chamber 86, attaches to the second end 82 of the piston 90 to close the fluid chamber 84, 86. A piston rod 94 extends along the center axis A, through the rod guide 92 and into the rebound chamber 86, and attaches to the piston 90 for moving the piston 90 along the center axis A between a compression stroke and a rebound stroke. The compression stroke is defined as the piston rod 94 and the piston 90 moving toward the first end 80 of the housing 78. The rebound stroke is defined as the piston rod 94 and the piston 90 moving toward the second end 82 of the housing 78.

An actuator 96 attaches to the housing 78 for modifying a height of a vehicle allowing the vehicle to adapt to different drive modes. The actuator 96 includes a threaded shaft 98, a threaded bushing 100, and a plurality of bushing ball bearings 102. The threaded shaft 98, having a generally tubular shape, attaches to an exterior surface of the housing 78 and extends annularly about the center axis A between a first opened end 104 and a second opened end 106. The first opened end 104 is located adjacent to the first end 80 of the housing 78 and attached to the housing 78. The second opened end 106 is axially spaced from the first end 80 and is attached to the housing 78. A snap ring 108, having a generally circular shape, is located adjacent the first open end 104 between the threaded shaft 98 and the housing 78 and extends about the center axis A for securing the threaded shaft 98 to the housing 78. In other words, the threaded shaft 98 is fixated onto the housing 78 and extends annularly about the housing 78. The threaded bushing 100, disposed about the threaded shaft 98, is rotatable about the center axis A and axially movable along the threaded shaft 98. The threaded bushing 100 extends between a primary end 110 and a secondary end 112. The primary end 110 of the threaded bushing 100 is located adjacent to the first opened end 104 of the threaded shaft 100. The secondary end 112 of the threaded bushing 100 is located axially spaced from the second opened end 106. The plurality of bushing ball bearings 102 are located between the threaded bushing 100 and the threaded shaft 98 for allowing the threaded bushing 100 to rotate about the threaded shaft 98 and translate a rotational movement of the threaded bushing 100 into an axial movement along the threaded shaft 98.

A cover 114, having a generally tubular shape, is disposed about the center axis A and radially spaced from the threaded bushing 100. The cover 114 extends along the center axis A between a proximate end 116 and a distal end 118 wherein the proximate end 116 is located adjacent to the primary end 100 of the threaded bushing 100 and the distal end 118 is located adjacent to the secondary end 112 of the threaded bushing 100. The cover 114 and the threaded bushing 100 collective define a compartment 120 extending about the center axis A between the cover 114 and the threaded bushing 100. An end plate 122 extends radially inwardly from the proximate end 116 to the primary end 110 and in an abutment relationship with the primary end 110. A plurality of fasteners 124, disposed adjacent to the proximate end 116 of the cover 114 and extends through the cover 114 and the end plate 122 attaching the end plate 122 to the cover 114. A spring seat 126, disposed in the compartment 120, extends between the distal end 118 of the cover 114 and the secondary end 112 of the threaded bushing 100. The spring seat 126 attaches to the cover 114 and the threaded bushing 100 for receiving a coil spring (not shown) extending helically about the housing 78. A plurality of bolts 128, disposed adjacent to the distal end 118 of the cover 114 and extends through the cover 114 and the spring seat 126 attaching the spring seat 126 to the cover 114. A plurality of cover ball bearings 128 disposed between the spring seat 126 and the threaded bushing 100 for allowing the threaded bushing 100 to rotate about spring seat 126.

An electric motor 130 is disposed in the compartment 120, coupled to the threaded bushing 100, for providing a rotational movement to the threaded bushing 100 to move the threaded bushing 100 axially along the threaded shaft 98 to raise and lower the height of the vehicle. In other words, the electrical motor 130 imitates a rotational movement for raising and lowering the height of the vehicle. The electric motor 130 includes a rotor 132, having a generally tubular shape, disposed adjacent to the secondary end 112 of the threaded bushing 100 and rotatable about the center axis A. A body 134, having a cylindrical shape, is disposed about the rotor 132 and extends annularly about the center axis A. A pair of bobbins 136, axially spaced from one another and adjacent to the body 134, extends annularly about the center axis A sandwiching the body 134 between the bobbins 136. Each of the bobbins 136 includes a coil 138 extending about the center axis A, in electrical connection with a power source for providing a current to the coils 138 thereby generating a magnetic field to rotate the rotor 132 in the compartment 120.

The wave gear apparatus 20 is disposed located in the compartment 120 and coupled to the primary end 110 of the threaded shaft 98 and the rotor 132 for reducing the rotational speed of the rotor 132 and increase torque of the electric motor 130 to rotate the threaded bushing 100 about the center axis A. According to one embodiment of the present invention, the spline 22 is disposed in the compartment 120, adjacent to the rotor 132, attached to the cover 114. The wave generator 24 is rotatably disposed in the spline 22 for engagement with the electric motor 130 to transferring the rotational movement of the rotor 132 to the threaded shaft 98. The protrusion 48, extending outwardly from the top portion 46 of the wave generator 24, couples the wave generator 24 to the rotor 132 of the electric motor 130 for rotational movement with the rotor 132.

The output member 28, receiving the wave generator 24 and the belt assembly 26, couples to the threaded bushing 100 for transferring rotational movement of the rotor 132 to the threaded bushing 100. The collar 64 of the output member extends about the center axis A and is coupled to the threaded bushing 50 for rotation with the threaded bushing 50.

In operation, to raise and lower the height of the vehicle, the electric motor 130 initiates a rotational movement to the wave gear apparatus 20 via the rotor 132. In response to the rotational movement of the rotor 132, the wave generator 24, coupled to the rotor 132, rotates along with the rotor 132. Because the total number of the belt teeth 52 is less than the total number of spline teeth 42, when the wave generator 24 rotates in the spline 22, the rotational speed of the rotor 132 is reduced by the wave generator 24. In addition, because the wave generator 24 is in engagement with the output member 28, the output member 28 rotates with the wave generator 24. Because the total number of the wall teeth 64 is equal to the total number of the belt teeth 52, the output member 28 may rotate at a same speed as the wave generator 24. Accordingly, the threaded bushing 100, attached to the output member 28, rotates with the output member 28, at the same rotational speed as the wave generator 24, and moves axially along the threaded shaft 98 to raise and lower the height of the vehicle.

Figure 9:
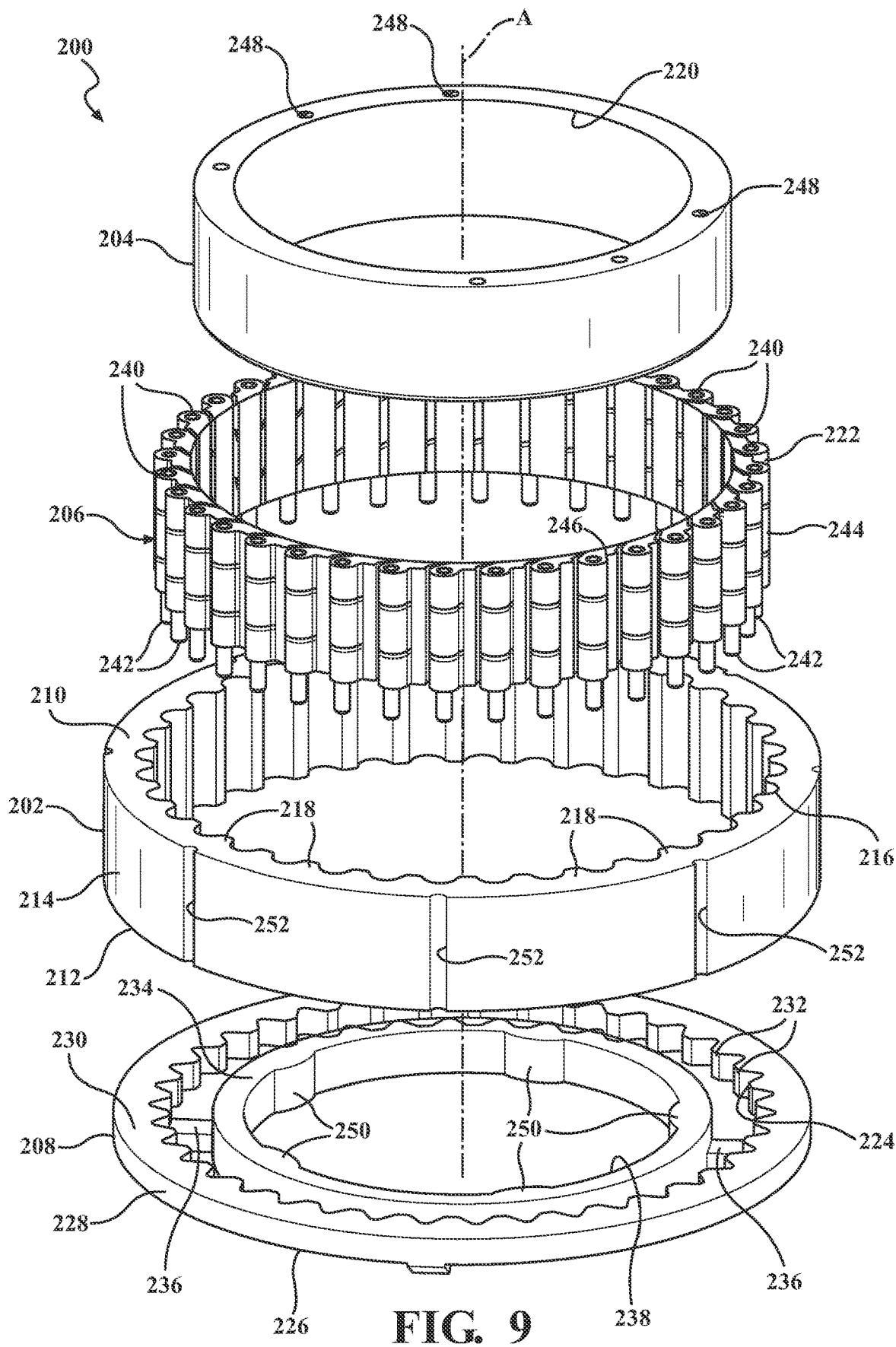
FIG. 9 is an exploded view of a wave gear apparatus constructed in accordance with another embodiment of the present invention.
Figure 10:
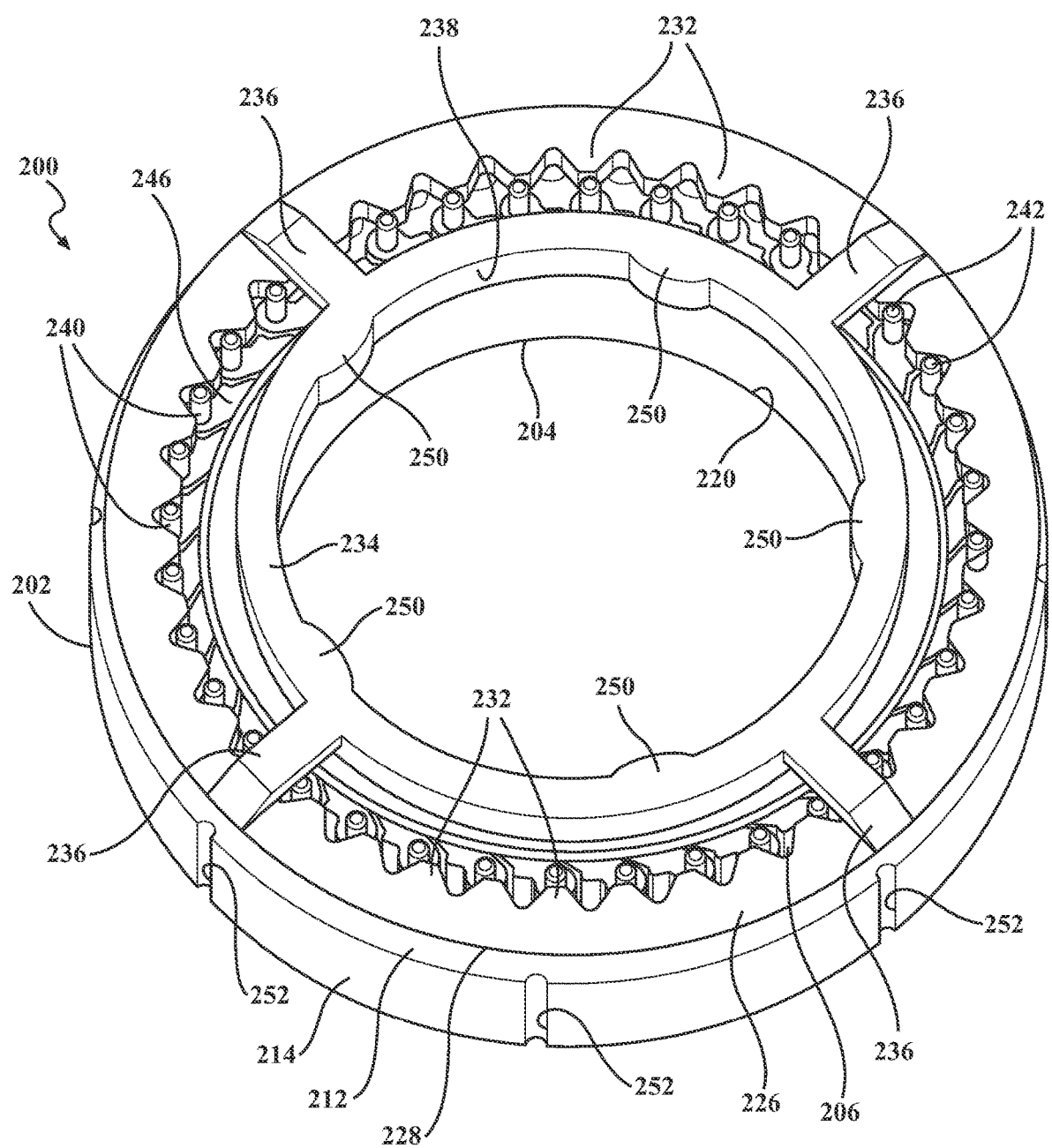
FIG. 10 is a bottom perspective view of the wave gear apparatus.
Figure 11:
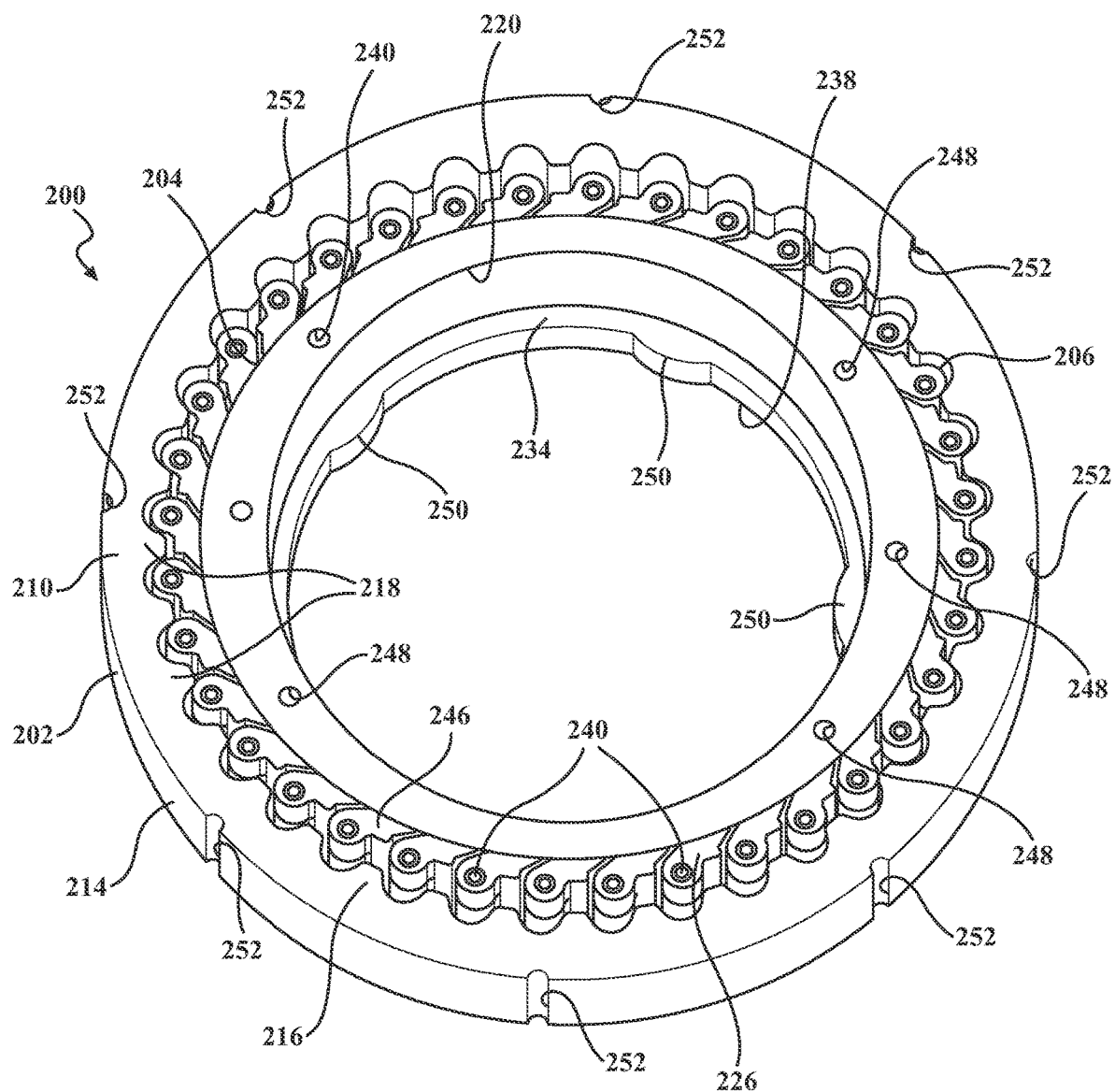
FIG. 11 is a top perspective view of the wave gear apparatus.

FIGS. 9-11 illustrates a wave generator apparatus 200 constructed in accordance with another embodiment of the present invention. The wave gear apparatus 200 comprises a spline 202, a wave generator 204, a belt assembly 206, and an output member 208. The spline 202 has a top surface 210, a bottom surface 212, an exterior surface 214, and an interior surface 216. The top surface 210 and the bottom surface 212 are spaced apart from one another. The exterior surface 214 and the interior surface 216 extend about a center axis A connecting the top surface 210 with the bottom surface 212. The spline 202 includes a plurality of spline teeth 218 extending radially inwardly from the interior surface 216 and center axis A and circumferentially spaced from one another. Accordingly to an embodiment of the present invention, each spline tooth of the plurality of spline teeth 218 can have a generally trapezoidal shape to present a first teeth profile.

The wave generator 204 is rotatably disposed in the spline 202. The wave generator 204, having a generally ring shape, extends about the center axis A. According to an embodiment of the present invention, the wave generator 204 can have an elliptical shape. The wave generator 204 defines a bore 220 extending along the center axis A through the wave generator 204. The belt assembly 206 extends about the wave generator 220. The belt assembly 206 includes a ring-shaped substrate defining a plurality of belt teeth a plurality of belt teeth 222 extending radially outwardly and configured to engage the spline teeth 218, i.e. the belt teeth 222 diametrically meshes with the spline teeth 218, whereby a total number of the belt teeth 222 is less than a total number of the spline teeth 218. According an embodiment of the present invention, a difference between the total number of the spline teeth 218 and the total number of the belt teeth 222 is equal to 2 or 4. Because the total number of the belt teeth 222 is less than the total number of spline teeth 218, this create a reduction ratio between the rotational speed of the rotor and the rotational speed of the wave generator 204. In some embodiments, the ring-shaped substrate includes a belt of resilient material, which may be formed as a single-piece continuous loop. Alternatively or additionally, the ring-shaped substrate may include a chain having a plurality of links, each link defining one of said belt teeth.

The output member 208 defines a recess 224 receiving the wave generator 204 and the belt assembly 206. The output member 208 engages the belt assembly 206 whereby, in response to a rotational movement from the wave generator 204, the output member 208 rotates in a direction same or opposite of the wave generator 204. With the wave generator 204 being received in the recess 224 of the output member 208, this makes the wave gear apparatus 200 more compact and allows for an easy assembly of the wave gear apparatus 200. The output member 208 includes a base plate 226, having a generally circular shape, disposed on the center axis A and in abutment relationship with the belt assembly 206 and the wave generator 204. The base plate 226 has a periphery 228 extending annularly about the center axis A. A wall 230 extends axially from the base plate 226, along the periphery 228 for engagement with the spline 202.

The wall 230 includes a plurality of wall teeth 232, spaced from one another, extending radially toward the center axis A for engagement with the belt assembly 206 to allow the output member 208 to rotate in a same speed as the belt assembly 206 and the wave generator 204. The wall teeth 232 present a second teeth profile that is different from the first teeth profile of the spline teeth 218 to allow the output member 208 to rotate in the same speed as the belt assembly 206 and the wave generator 204. According to an embodiment of the present invention, each wall tooth of the plurality of wall teeth 232 has a generally triangular shape to present the second teeth profile. The output member 208 includes a collar 234 located radially inwardly from the wall 230 and extending annularly about the center axis A to define the recess 224 extending about the center axis A and between the collar 234, the base plate 226, and the wall 230. A plurality of connecting members 236 extend radially outwardly from the collar 234 and couple to the base plate 228 to connect the collar 234 to the base plate 226. The collar 234 extends through the bore 220 and defines a hole 238 extending along the center axis A.

Each belt tooth 222 of the plurality of belt teeth 222 includes a metal insert 240 disposed therein to provide reinforcement and rigidity to the belt teeth 222. The metal insert 240 extends along the center axis A through the belt assembly 206 to an insert end 242 spaced apart from the belt assembly 206. The insert end 242 is in mesh engagement with the wall teeth 232 for transferring rotational movement of the wave generator 204 to the output member 208.

The belt assembly 206 may be configured as a chain 244 including a plurality of links 246, each having a similar or identical construction. The links 246 are connected to one another to form a continuous loop. Each of the links 246 defines a corresponding one of the belt teeth 222. The wave generator 204 can define a plurality of orifices 248 for coupling the wave generator 204 to a driving member, such as an electrical motor. The collar 234 includes a plurality of engagement members 250, circumferentially spaced from one another, extending radially inwardly toward the center axis A for engaging a shaft and transferring the rotational movement of the electric motor to the shaft. The exterior surface 214 of the spline 202 defines a plurality of channels 252, circumferentially spaced from one another, extending from the top surface 210 to the bottom surface 212.

In operation, an input of a rotational movement or a torque load is first introduced to the wave gear apparatus 200 via the wave generator 204 through an electric motor or any other rotational movement generating source. According to an embodiment of the present invention, the plurality of orifices 250 of the wave generator 204 can be coupled to the electric motor or the rotational movement generating source allowing the wave generator 204 to introduce the rotational movement to the wave gear apparatus 200. As the wave generator 204 rotates in the spline 202, the belt assembly 206 deforms in response to the movement of the wave generator 204 and slides around the wave generator 204. As the belt assembly 206 slides around the wave generator 204, the belt teeth 222 is in mesh engagement with the spline teeth 218. Because the total number of the belt teeth 222 is less than the total number of spline teeth 218, as the wave generator 204 rotates in the spline 202, the rotational speed of the wave generator 204 is reduced. In addition, as the belt assembly 206 slides around the wave generator 204, the insert end 242 of the metal insert 240 is in mesh engagement with the wall teeth 232. Because the total number of the wall teeth 232 is equal to the total number of the belt teeth 222, the output member 208 may rotate at a same speed as the wave generator 204.

Accordingly, because the belt teeth 222 engage both the spline teeth 218 and the wall teeth 232, a shear force is generated due to the introduction of the torque load. According to one embodiment of the present invention, the belt assembly 206 can be made from an elastomeric material, e.g.

rubber. With the belt assembly 206 being made from the elastomeric material, it can withstand the shear force generated due to the introduction of the rotational movement or torque load thereby reducing the noise, vibration, and harshness levels (NVH) of the wave gear apparatus 200.

Figure 12:
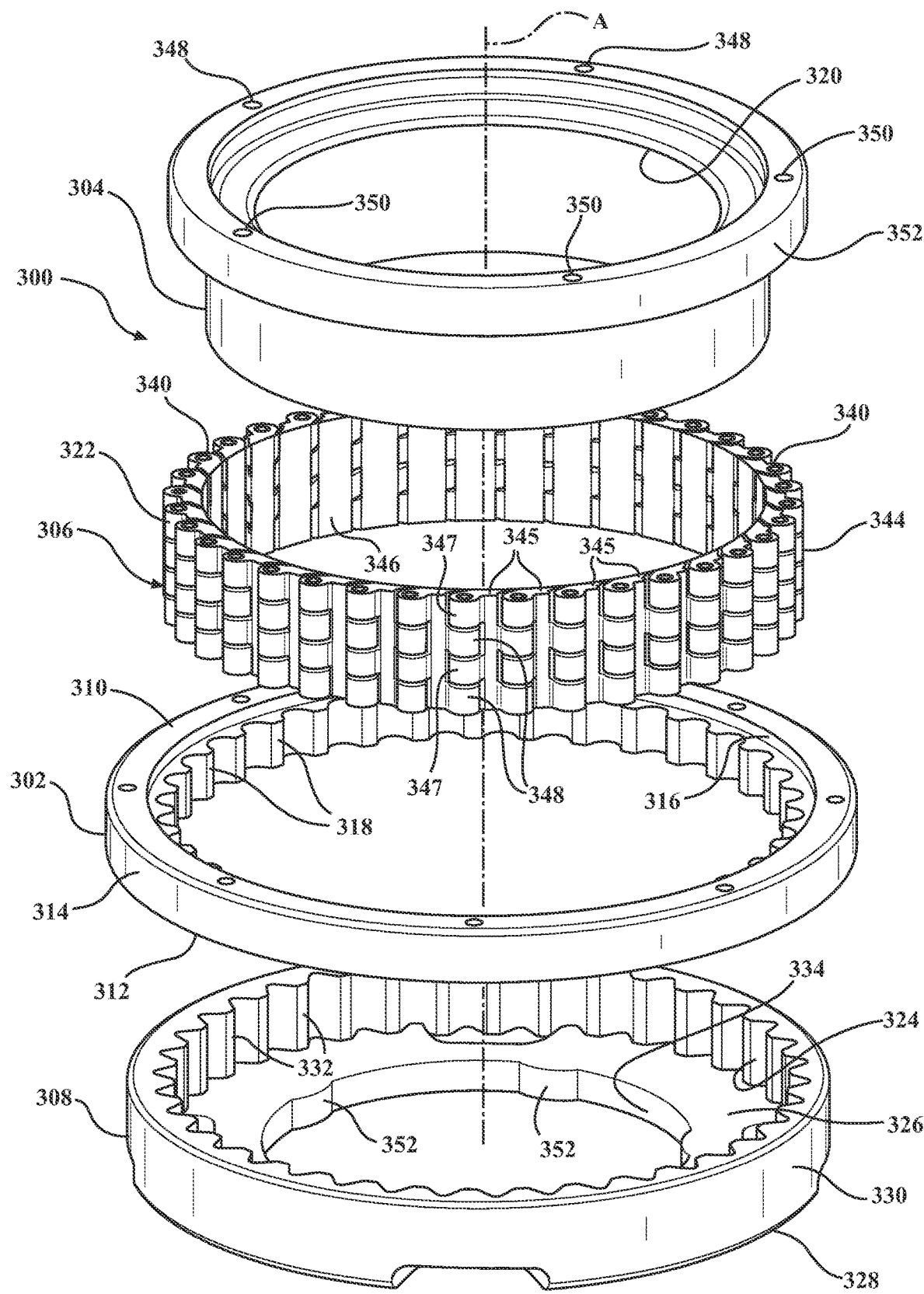
FIG. 12 is an exploded view of a wave gear apparatus constructed in accordance with another embodiment of the present invention

FIG. 12 illustrates a wave generator apparatus 300 constructed in accordance with another embodiment of the present disclosure. The wave gear apparatus 300 comprises a spline 302, a wave generator 304, a belt assembly 306, and an output member 308. The spline 302 has a top surface 310, a bottom surface 312, an exterior surface 314, and an interior surface 316. The top surface 310 and the bottom surface 312 are spaced apart from one another. The exterior surface 314 and the interior surface 316 extend about a center axis A connecting the top surface 310 with the bottom surface 312. The spline 302 includes a plurality of spline teeth 318 extending radially inwardly from the interior surface 316 and center axis A and circumferentially spaced from one another. Accordingly to an embodiment of the present disclosure, each spline tooth of the plurality of spline teeth 318 can have a generally trapezoidal shape to present a first teeth profile.

The wave generator 304 is rotatably disposed in the spline 302. The wave generator 304, having a generally ring shape, extends about the center axis A. According to an embodiment of the present disclosure, the wave generator 304 can have an elliptical shape. The wave generator 304 defines a bore 320 extending along the center axis A through the wave generator 304. The belt assembly 306 extends about the wave generator 320.

The belt assembly 306 may be configured as a chain 344 including a plurality of links 345, each having a similar or identical construction. The links 345 are connected to one another to form a continuous loop. Each of the links 345 includes a backing plate 346 facing toward a center of the continuous loop, and two first tubular portions 347 attached to the backing plate and facing outwardly away from the center of the continuous loop. The first tubular portions 347 are coaxial with one another and spaced apart from one another by a distance approximately equal to an axial length of each of the first tubular portions 347. Each of the links 345 also includes two second tubular portions 348 attached to the backing plate and facing outwardly away from the center of the continuous loop and in a direction opposite of the first tubular portions 347. The second tubular portions 348 are coaxial with one another and spaced apart from one another by a distance approximately equal to an axial length of each of the second tubular portions 348.

Figure 13:
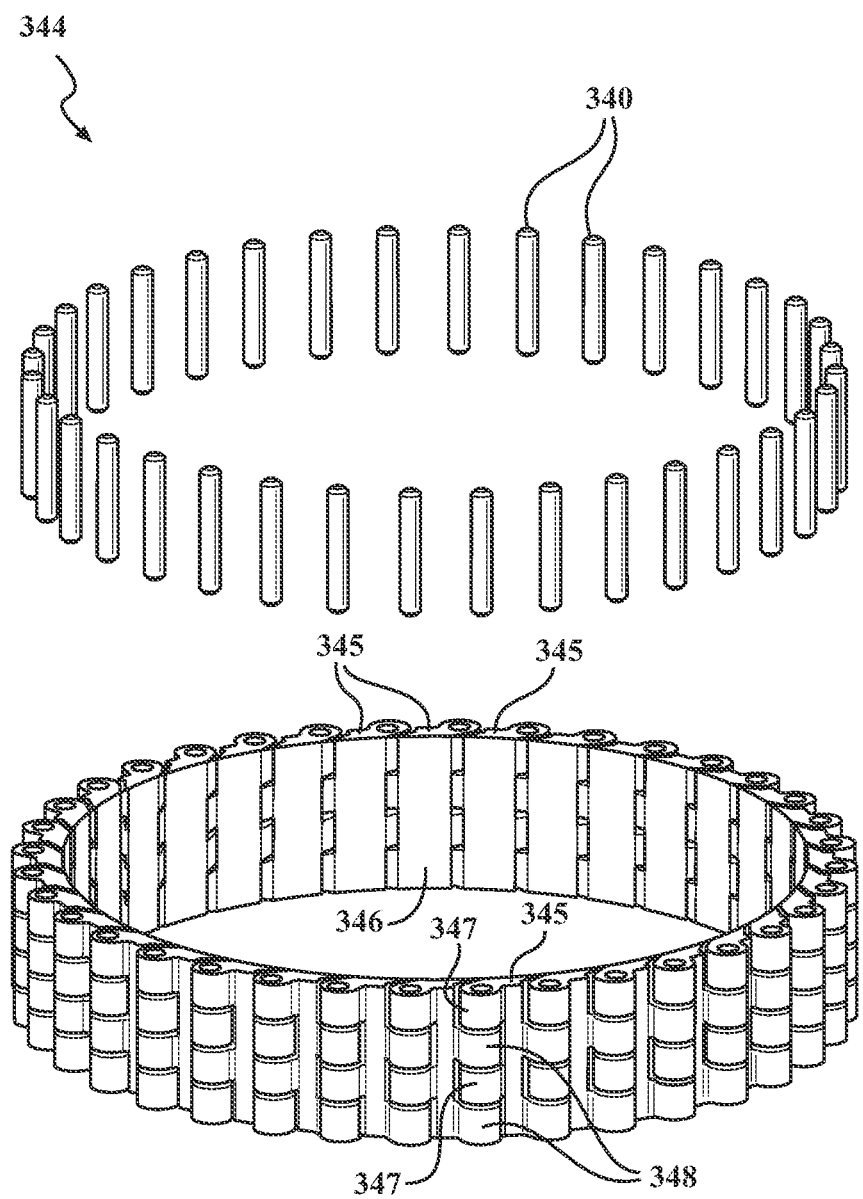
FIG. 13 is an exploded view of a chain for a wave gear apparatus in accordance with an aspect of the present disclosure.

The first tubular portions 347 of a given one of the links 345 of the chain 344 are configured to interweave with the second tubular portions 348 of a next-adjacent one of the links 345 of the chain 344. A link pin 340 extends through the first tubular portions 347 of one of the links 345 and the interweaved second tubular portions 348 of the next-adjacent one of the links 345, thereby coupling the two links 345 of the chain together. The link pin 340 may also function to provide reinforcement and rigidity to the belt teeth 322. Each stack of the first tubular portions 347 and the second tubular portions 348 connected together defines a belt tooth 322 of the chain 344. The belt teeth 322, therefore, extend radially outwardly for engaging the spline teeth 318, i.e. the belt teeth 322 diametrically meshes with the spline teeth 318, whereby a total number of the belt teeth 322 is less than a total number of the spline teeth 318. FIG. 13 shows an exploded view of the chain 344.

According an embodiment of the present disclosure, a difference between the total number of the spline teeth 318 and the total number of the belt teeth 322 is equal to 2 or 4. Because the total number of the belt teeth 322 is less than the total number of spline teeth 318, this may create a reduction ratio between the rotational speed of the rotor and the rotational speed of the wave generator 304.

The output member 308 defines a recess 324 for receiving the wave generator 304 and the belt assembly 306. The output member 308 engages the belt assembly 306 whereby, in response to a rotational movement from the wave generator 304, the output member 308 rotates in a direction same or opposite of the wave generator 304. With the wave generator 304 being received in the recess 324 of the output member 308, this makes the wave gear apparatus 300 more compact and allows for an easy assembly of the wave gear apparatus 300. The output member 308 includes a base plate 326, having a generally circular shape, disposed on the center axis A and in abutment relationship with the belt assembly 306 and the wave generator 304. The base plate 326 has a periphery 328 extending annularly about the center axis A. A wall 330 extends outwardly from the periphery 328 and about the center axis A for engagement with the spline 302. The wall 330 includes a plurality of wall teeth 332, spaced from one another, extending outwardly from the wall 330 and radially toward the center axis A for engagement with the belt assembly 306 to allow the output member 308 to rotate in a same speed as the belt assembly 306 and the wave generator 304. The wall teeth 332 can present a second teeth profile that is different from the first teeth profile of the spline teeth 318 to allow the output member 308 to rotate in the same speed as the belt assembly 306 and the wave generator 304. According to an embodiment of the present disclosure, each wall tooth 332 of the plurality of wall teeth 332 has a generally triangular shape to present the second teeth profile. The output member 308 defines a perforation 334, having a generally circular shape, located on the center axis A and in communication with the bore 320.

The wave generator 304 can define a plurality of orifices 350 for coupling the wave generator 304 to a driving member, such as an electrical motor. The base plate 326 includes a plurality of engagement members 352, circumferentially spaced from one another, extending radially inwardly toward the center axis A for engaging a shaft and transferring the rotational movement of the electric motor to the shaft. The wave generator 304 includes a flange 352, located adjacent to the orifices 348, extending radially outwardly from the wave generator 304 and annularly about the center axis A. The flange 352 is in an abutment relationship with the spline 302 to sandwich the spline 302 between the output member 308 and the wave generator 304 and prevent axial movement of the spline 302.

In operation, an input of a rotational movement or a torque load is first introduced to the wave gear apparatus 300 via the wave generator 304 through an electric motor or any other rotational movement generating source. According to an embodiment of the present disclosure, the plurality of orifices 350 of the wave generator 304 can be coupled to the electric motor or the rotational movement generating source allowing the wave generator 304 to introduce the rotational movement to the wave gear apparatus 300. As the wave generator 304 rotates in the spline 302, the belt assembly 306 deforms in response to the movement of the wave generator 304 and slides around the wave generator 304. As the belt assembly 306 slides around the wave generator 304, the belt teeth 322 is in mesh engagement with the spline teeth 318. Because the total number of the belt teeth 322 is less than the total number of spline teeth 318, as the wave generator 304 rotates in the spline 302, the rotational speed of the wave generator 304 is reduced. In addition, as the belt assembly 306 slides around the wave generator 304, the belt assembly 306 is also in mesh engagement with the wall teeth 332. Because the total number of the wall teeth 332 is equal to the total number of the belt teeth 322, the output member 308 rotates, in a direction that is the same or opposite of the rotational direction of the wave generator 304. Accordingly, because the belt teeth 322 engage both the spline teeth 318 and the wall teeth 332, a shear force is generated due to the introduction of the torque load. According to one embodiment of the present disclosure, the belt assembly 306 can be made from an elastomeric material, e.g. rubber. With the belt assembly 306 being made from the elastomeric material, it can withstand the shear force generated due to the introduction of the rotational movement or torque load thereby reducing the noise, vibration, and harshness levels (NVH) of the wave gear apparatus 300.

Figure 14:
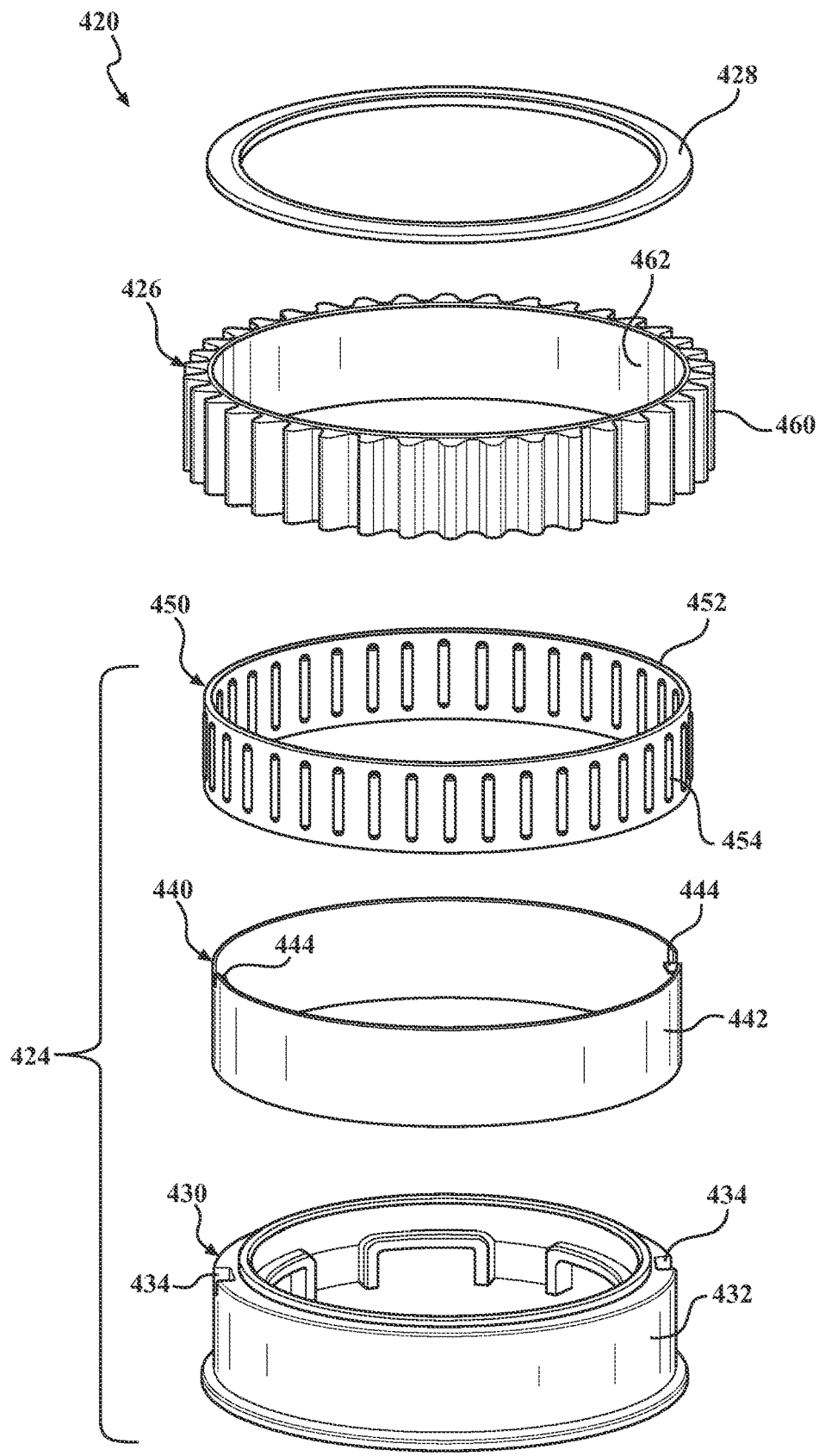
FIG. 14 is an exploded view of a wave gear apparatus constructed in accordance with another embodiment of the present disclosure.

FIG. 14 is an exploded view of a wave gear apparatus 420 constructed in accordance with another embodiment of the present disclosure. The wave gear apparatus 420 of FIG. 14 includes a wave generator 424 and a belt assembly 426 configured to wrap around the wave generator 424 and to rotate thereabout. The wave gear apparatus 420 also includes a top washer 428 that overlies the belt assembly 426 to prevent the belt assembly 426 from moving axially off of the wave generator 424. The wave generator 424 may function similarly to the wave generator assembly 26 of the wave gear apparatus 20 of FIG. 2, and the belt assembly 426 may function similarly to the belt assembly 26 of the wave gear apparatus 20 of FIG. 2.

The wave generator 424 includes an eccentric core 430 having an outer wall 432 with an oval-shaped profile. The eccentric core 430 may be made of molded plastic. However, other materials, such as metal or composite material may be used. The eccentric core 430 defines two indentations 434 in the outer wall 432 at opposite sides thereof and adjacent to an axial end thereof. The wave generator 424 also includes a cladding sleeve 440 of hard material, such as steel. The cladding sleeve 440 has a hollow oblong-cylinder shape configured to cover the outer wall 432 of the eccentric core 430. The cladding sleeve 440 defines a flat outer surface 442 and two tabs 444 extending radially inwardly. The tabs 444 of the cladding sleeve 440 are configure to engage corresponding ones of the indentations 434 in the eccentric core 430 to hold the cladding sleeve 440 onto the eccentric core 430 and to prevent relative rotation therebetween.

The wave generator 424 also includes a bearing assembly 450 having a cage 452 and a plurality of needles 454. The needles 454 each extend parallel to an axis of the eccentric core 430 and are spaced apart from one another and held in position by the cage 452. The bearing assembly 430 is configured to extend around the flat outer surface 442 of the cladding sleeve 440. The bearing assembly 430 may be flexible to conform to the shape of the outer wall 432 of the eccentric core 430 as the belt 460 rotates around the wave generator 424.

The belt assembly 426, includes a belt 460 of resilient material, such as hard polyurethane, disposed around a backing sleeve 462 of hard material, such as steel. The backing sleeve 462 may be formed as a hollow cylinder with a thin sidewall. The backing sleeve 462 may be flexible to conform to the shape of the outer wall 432 of the eccentric core 430 as the belt 460 rotates around the wave generator 424. In some embodiments, the resilient material of the belt 460 may be over molded on the backing sleeve 462. The resilient material of the belt 460 may be joined to the backing sleeve 462 by other means, such as using a friction fit, by welding, using an adhesive, etc.

In operation, the bearing assembly 450 may be sandwiched between the cladding sleeve 440 of the wave generator 424 and the backing sleeve 462 of the belt assembly 426, with the needles 454 rolling therebetween to provide a smooth fitment with relatively low friction between the belt assembly 426 and the wave generator 424.

Figure 15:
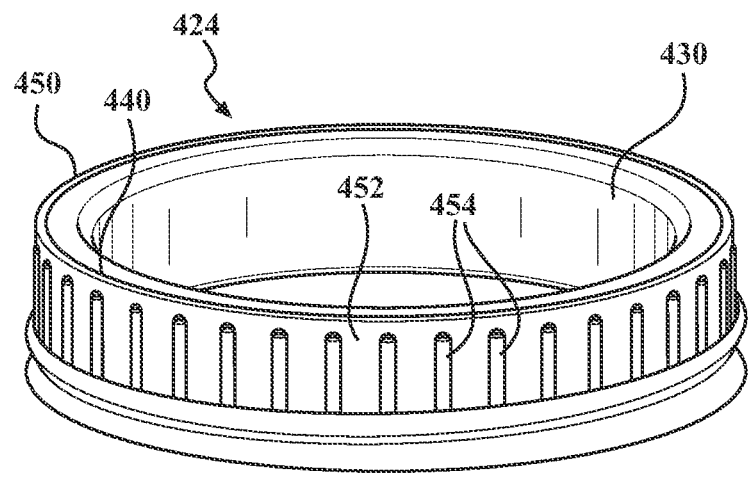
FIG. 15 is a perspective view of a wave generator in accordance with an aspect of the present disclosure.

FIG. 15 is a perspective view of the wave generator 424 in accordance with an aspect of the present disclosure.

Figure 16:
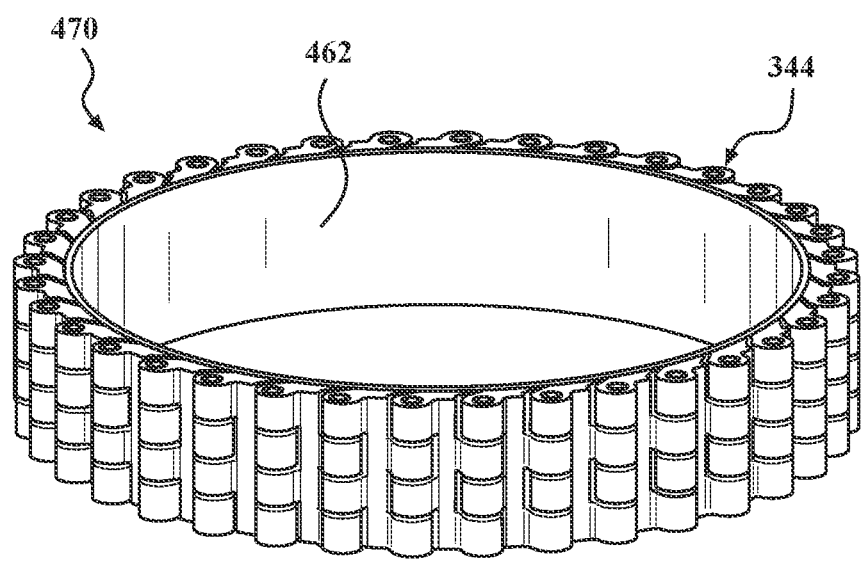
FIG. 16 is a perspective view of a chain assembly for the wave gear apparatus in accordance with an aspect of the present disclosure.

FIG. 16 is a perspective view of a chain assembly 470 in accordance with an aspect of the present disclosure. The chain assembly 470 includes the chain 344 disposed around the backing sleeve 462. The chain assembly 470, when used in combination with the wave generator 424 having the bearing assembly 450, may provide additional efficiency gains and/or ability to load handling capacity.

A wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core; and a belt assembly extending about the wave generator. The belt assembly includes a ring-shaped substrate defining a plurality of belt teeth extending radially outwardly and configured to engage the spline teeth, whereby a total number of the belt teeth is less than a total number of the spline teeth. The wave gear apparatus also comprises a bearing assembly disposed between the wave generator and the belt assembly and including a plurality of needles each extending parallel to the center axis; and an output member engaging the belt assembly and defining a recess receiving the wave generator and the belt assembly.

In some embodiments, the ring-shaped substrate may comprise a belt of resilient material. In some embodiments, the ring-shaped substrate comprises a chain having a plurality of links, each link defining one of the belt teeth.

In some embodiments, the belt assembly further comprises a backing sleeve, and the plurality of needles of the bearing assembly are configured to roll along the backing sleeve.

In some embodiments, the output member includes a base plate disposed in abutment relationship with the belt assembly and the wave generator and the base plate includes a periphery extending annularly about the center axis.

In some embodiments, the wave gear apparatus may further include a wall extending axially from the base plate along the periphery and configured to engage the spline, and the wall may define a plurality of wall teeth, spaced from one another, extending radially toward the center axis for engaging the belt assembly.

A wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core; and a belt assembly extending about the wave generator, the belt assembly including a backing sleeve and a ring-shaped substrate defining a plurality of belt teeth extending radially outwardly for engaging the spline teeth, whereby a total number of the belt teeth is less than a total number of the spline teeth. The wave gear apparatus also comprises a bearing assembly disposed between the wave generator and the belt assembly; and an output member engaging the belt assembly and defining a recess receiving the wave generator and the belt assembly.

In some embodiments, the backing sleeve is made of steel. In some embodiments, the backing sleeve is formed as a hollow cylinder.

In some embodiments, the ring-shaped substrate comprises a belt of resilient material. In some embodiments, the belt assembly includes the belt of resilient material overmolded on the backing sleeve. In some embodiments, the ring-shaped substrate comprises a chain having a plurality of links, each link defining one of the belt teeth.

In some embodiments, the output member includes a base plate disposed in abutment relationship with the belt assembly and the wave generator and the base plate having a periphery extending annularly about the center axis.

In some embodiments, the wave gear apparatus further includes a wall extending axially from the base plate along the periphery and configured to engage the spline, and the wall defines a plurality of wall teeth, spaced from one another, extending radially toward the center axis for engaging the belt assembly.

It is another aspect of the present invention to provide a wave gear apparatus. The wave gear apparatus comprises a spline having a top surface, a bottom surface, an exterior surface, and an interior surface with the top surface and the bottom surface being axially spaced from one another and the exterior surface and the interior surface extending annularly about a center axis and between the top surface and the bottom surface, with a plurality of spline teeth extending from the interior surface toward the center axis. The wave gear apparatus also comprises a wave generator rotatably disposed in the spline and including an eccentric core, the eccentric core defining an indentation; and a belt assembly extending about the wave generator, the belt assembly including a ring-shaped substrate defining a plurality of belt teeth extending radially outwardly for engaging the spline teeth, whereby a total number of the belt teeth is less than a total number of the spline teeth. The wave gear apparatus also comprises a cladding sleeve surrounding the eccentric core of the wave generator, the cladding sleeve including a protrusion configured to engage the indentation in the eccentric core for preventing relative rotation between the eccentric core and the cladding sleeve; a bearing assembly disposed between the cladding sleeve and the belt assembly; and an output member engaging the belt assembly and defining a recess receiving the wave generator and the belt assembly.

In some embodiments, the indentation is one of a plurality of indentations in the eccentric core, and wherein the protrusion is one of a plurality of protrusions each configured to engage a corresponding one of the plurality of indentations in the eccentric core. In some embodiments, the bearing assembly includes a plurality of needles configured to roll along the cladding sleeve.

In some embodiments, belt assembly further comprises a backing sleeve, and wherein the plurality of needles of the bearing assembly are configured to roll along the backing sleeve. In some embodiments, the ring-shaped substrate comprises a belt of resilient material. In some embodiments, the ring-shaped substrate comprises a chain having a plurality of links, each link defining one of the belt teeth.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A wave gear apparatus comprising:
a spline having a top surface, a bottom surface, an exterior surface, and an interior surface with said top surface and said bottom surface being axially spaced from one another and said exterior surface and said interior surface extending annularly about a center axis and between said top surface and said bottom surface, with a plurality of spline teeth extending from said interior surface toward said center axis;
a wave generator rotatably disposed in said spline and including an eccentric core;
a belt assembly extending about said wave generator, said belt assembly including a ring-shaped substrate defining a plurality of belt teeth extending radially outwardly and configured to engage said spline teeth, whereby a total number of said belt teeth is less than a total number of said spline teeth;
a bearing assembly disposed between said wave generator and said belt assembly and including a plurality of needles each extending parallel to the center axis; and
an output member engaging said belt assembly and defining a recess receiving said wave generator and said belt assembly.

2. The wave gear apparatus as set forth in claim 1, wherein said ring-shaped substrate comprises a belt of resilient material.

3. The wave gear apparatus as set forth in claim 1, wherein said ring-shaped substrate comprises a chain having a plurality of links, each link defining one of said belt teeth.

4. The wave gear apparatus as set forth in claim 1, wherein said belt assembly further comprises a backing sleeve, and wherein said plurality of needles of said bearing assembly are configured to roll along the backing sleeve.

5. The wave gear apparatus as set forth in claim 1, wherein said output member includes a base plate disposed in abutment relationship with said belt assembly and said wave generator and said base plate having a periphery extending annularly about said center axis.

6. The wave gear apparatus as set forth in claim 5, further including a wall extending axially from said base plate along said periphery and configured to engage said spline,
wherein said wall defines a plurality of wall teeth, spaced from one another, extending radially toward said center axis for engaging said belt assembly.

7. A wave gear apparatus comprising:
a spline having a top surface, a bottom surface, an exterior surface, and an interior surface with said top surface and said bottom surface being axially spaced from one another and said exterior surface and said interior surface extending annularly about a center axis and between said top surface and said bottom surface, with a plurality of spline teeth extending from said interior surface toward said center axis;
a wave generator rotatably disposed in said spline and including an eccentric core;

a belt assembly extending about said wave generator, said belt assembly including a backing sleeve and a ring-shaped substrate defining a plurality of belt teeth extending radially outwardly for engaging said spline teeth, whereby a total number of said belt teeth is less than a total number of said spline teeth;

a bearing assembly disposed between said wave generator and said belt assembly; and an output member engaging said belt assembly and defining a recess receiving said wave generator and said belt assembly.

8. The wave gear apparatus as set forth in claim 7, wherein said backing sleeve is made of steel.

9. The wave gear apparatus as set forth in claim 7, wherein said backing sleeve is formed as a hollow cylinder.

10. The wave gear apparatus as set forth in claim 7, wherein said ring-shaped substrate comprises a belt of resilient material.

11. The wave gear apparatus as set forth in claim 10, wherein said belt assembly includes said belt of resilient material overmolded on said backing sleeve.

12. The wave gear apparatus as set forth in claim 7, wherein said ring-shaped substrate comprises a chain having a plurality of links, each link defining one of said belt teeth.

13. The wave gear apparatus as set forth in claim 7, wherein said output member includes a base plate disposed in abutment relationship with said belt assembly and said wave generator and said base plate having a periphery extending annularly about said center axis.

14. The wave gear apparatus as set forth in claim 13, further including a wall extending axially from said base plate along said periphery and configured to engage said spline,
wherein said wall defines a plurality of wall teeth, spaced from one another, extending radially toward said center axis for engaging said belt assembly.

15. A wave gear apparatus comprising:

a spline having a top surface, a bottom surface, an exterior surface, and an interior surface with said top surface and said bottom surface being axially spaced from one another and said exterior surface and said interior surface extending annularly about a center axis and between said top surface and said bottom surface, with a plurality of spline teeth extending from said interior surface toward said center axis;

a wave generator rotatably disposed in said spline and including an eccentric core, the eccentric core defining an indentation;

a belt assembly extending about said wave generator, said belt assembly including a ring-shaped substrate defining a plurality of belt teeth extending radially outwardly for engaging said spline teeth, whereby a total number of said belt teeth is less than a total number of said spline teeth;

a cladding sleeve surrounding the eccentric core of the wave generator, the cladding sleeve including a protrusion configured to engage the indentation in the eccentric core for preventing relative rotation between the eccentric core and the cladding sleeve;

a bearing assembly disposed between said cladding sleeve and said belt assembly; and an output member engaging said belt assembly and defining a recess receiving said wave generator and said belt assembly.

16. The wave gear apparatus as set forth in claim 15, wherein said indentation is one of a plurality of indentations in the eccentric core, and wherein the protrusion is one of a plurality of protrusions each configured to engage a corresponding one of the plurality of indentations in the eccentric core.

17. The wave gear apparatus as set forth in claim 15, wherein said bearing assembly includes a plurality of needles configured to roll along said cladding sleeve.

18. The wave gear apparatus as set forth in claim 17, wherein said belt assembly further comprises a backing sleeve, and wherein said plurality of needles of said bearing assembly are configured to roll along the backing sleeve.

19. The wave gear apparatus as set forth in claim 15, wherein said ring-shaped substrate comprises a belt of resilient material.

20. The wave gear apparatus as set forth in claim 15, wherein said ring-shaped substrate comprises a chain having a plurality of links, each link defining one of said belt teeth.

* * * * *